US006919664B2

(12) United States Patent
Leijon et al.

(10) Patent No.: US 6,919,664 B2
(45) Date of Patent: Jul. 19, 2005

(54) HIGH VOLTAGE PLANTS WITH ELECTRIC MOTORS

(75) Inventors: Mats Leijon, Västerås (SE); Lars Gertmar, Västerås (SE); Lennart Brandt, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 08/952,995

(22) PCT Filed: May 27, 1997

(86) PCT No.: PCT/SE97/00887

§ 371 (c)(1),
(2), (4) Date: Mar. 26, 1998

(87) PCT Pub. No.: WO97/45925

PCT Pub. Date: Dec. 4, 1997

(65) Prior Publication Data

US 2002/0047413 A1 Apr. 25, 2002

(30) Foreign Application Priority Data

May 29, 1996 (SE) .............................. 9602079

(51) Int. Cl.[7] .............................. H02K 3/40; H02K 3/12
(52) U.S. Cl. ...................... 310/196; 319/179; 319/180; 319/195; 174/DIG. 19; 174/DIG. 29
(58) Field of Search ..................... 174/DIG. 13–33, 174/120 SC, 127; 310/179, 180, 196, 198, 43, 45, 215

(56) References Cited

U.S. PATENT DOCUMENTS

| 681,800 | A | | 9/1901 | Lasche |
| 847,008 | A | | 3/1907 | Kitsee |
| 878,165 | A | * | 2/1908 | Tingley ................ 310/65 |
| 1,304,451 | A | | 5/1919 | Burnham |
| 1,418,856 | A | | 6/1922 | Williamson |

(Continued)

FOREIGN PATENT DOCUMENTS

| AT | 399790 | 7/1995 |
| BE | 565063 | 2/1957 |
| CH | 391071 | 4/1965 |
| CH | SU 266037 | 10/1965 |
| CH | 534448 | 2/1973 |
| CH | 539328 | 7/1973 |

(Continued)

OTHER PUBLICATIONS

Shipboard Electrical Insulation; G. L. Moses, 1951, pp2&3.
ABB Elkrafthandbok; ABB AB; 1988; pp274–276.
Elkraft teknisk Handbok, 2 Elmaskiner; A. Alfredsson et al; 1988, pp 121–123.
High Voltage Cables in a New Class of Generators Powerformer; M. Leijon et al; Jun. 14, 1999; pp1–8.
Ohne Tranformator direkt ins Netz; Owman et al, ABB, AB; Feb. 8, 1999; pp48–51.

(Continued)

Primary Examiner—Burton Mullins
(74) Attorney, Agent, or Firm—Dykema Gossett PLLC

(57) ABSTRACT

In a plant comprising one or more electric machines constructed with insulated conductors and connected for heavy current via insulated conductors, the magnetic circuit in at least one of these electric machines is connected directly to a high supply voltage of 20–800 kV, preferably higher than 36 kV. The insulation of the electric machine is built up of a cable (6) placed in its winding and comprising one or more current-carrying conductors (31) with a number of strands (36) surrounded by outer and inner semiconducting layers (34, 32) and intermediate insulating layers (33). The conductors (31) may be group-wise connected in parallel and semiconducting layers are therefore not required around every conductor in the group. If the conductors (31) are connected in series with each other within the group a part insulation (35) is required which will withstand a few kV, whereas connection of the conductors (31) to every phase requires a strong part insulation (35) which will withstand the phase voltage of the high-voltage supply network.

31 Claims, 3 Drawing Sheets

U.S. PATENT DOCUMENTS

| | | |
|---|---|---|
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. .......... 252/510 |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A * | 12/1961 | Shildneck .................... 310/64 |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. ........ 310/214 |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. ............. 310/196 |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,487,455 A * | 12/1969 | Laurell et al. ........ 174/120 SC |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,887,860 A * | 6/1975 | Bernhardt et al. ............ 307/31 |
| 3,891,880 A | 6/1975 | Britsch ...................... 310/196 |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey ...................... 106/26 |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs ........................ 428/212 |
| 3,993,860 A | 11/1976 | Snow et al. |
| 3,995,785 A | 12/1976 | Arick et al. |
| 4,001,616 A | 1/1977 | Lonseth et al. ............... 310/45 |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. ........... 252/511 |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. ............ 310/45 |
| 4,208,597 A | 6/1980 | Mulach et al. |

| | | |
|---|---|---|
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |
| 4,308,476 A * | 12/1981 | Schuler ............. 310/45 |
| 4,308,575 A | 12/1981 | Mase |
| 4,310,966 A | 1/1982 | Breitenbach |
| 4,314,168 A | 2/1982 | Breitenbach |
| 4,317,001 A | 2/1982 | Silver et al. |
| 4,320,645 A | 3/1982 | Stanley |
| 4,321,426 A | 3/1982 | Schaeffer |
| 4,321,518 A | 3/1982 | Akamatsu |
| 4,330,726 A | 5/1982 | Albright et al. |
| 4,337,922 A | 7/1982 | Streiff et al. |
| 4,341,989 A | 7/1982 | Sandberg et al. |
| 4,347,449 A | 8/1982 | Beau |
| 4,347,454 A | 8/1982 | Gellert et al. |
| 4,355,255 A * | 10/1982 | Herr et al. ............ 310/254 |
| 4,357,542 A | 11/1982 | Kirschbaum |
| 4,360,748 A | 11/1982 | Raschbichler et al. |
| 4,361,723 A | 11/1982 | Hvizd, Jr. et al. |
| 4,363,612 A | 12/1982 | Walchhutter |
| 4,365,178 A | 12/1982 | Lenz |
| 4,365,506 A * | 12/1982 | Hyde ............. 318/490 |
| 4,367,425 A | 1/1983 | Mendelsohn et al. |
| 4,367,890 A | 1/1983 | Spirk |
| 4,368,418 A | 1/1983 | DeMello et al. |
| 4,369,389 A | 1/1983 | Lambrecht ............ 310/214 |
| 4,371,745 A | 2/1983 | Sakashita ............ 174/115 |
| 4,384,944 A | 5/1983 | Silver et al. |
| 4,387,316 A | 6/1983 | Katsekas |
| 4,401,920 A | 8/1983 | Taylor et al. |
| 4,403,163 A | 9/1983 | Armerding et al. ........ 310/213 |
| 4,404,486 A | 9/1983 | Keim et al. |
| 4,411,710 A | 10/1983 | Mochizuki et al. |
| 4,421,284 A | 12/1983 | Pan |
| 4,425,521 A | 1/1984 | Rosenberry, Jr. et al. |
| 4,426,771 A | 1/1984 | Wang et al. |
| 4,429,244 A | 1/1984 | Nikiten et al. |
| 4,431,960 A | 2/1984 | Zucker |
| 4,432,029 A | 2/1984 | Lundqvist |
| 4,437,464 A | 3/1984 | Crow |
| 4,443,725 A | 4/1984 | Derderian et al. |
| 4,470,884 A | 9/1984 | Carr |
| 4,473,765 A | 9/1984 | Butman, Jr. et al. ....... 310/215 |
| 4,475,075 A | 10/1984 | Munn |
| 4,477,690 A | 10/1984 | Nikitin et al. |
| 4,481,438 A | 11/1984 | Keim |
| 4,484,106 A | 11/1984 | Taylor et al. |
| 4,488,079 A | 12/1984 | Dailey et al. |
| 4,490,651 A | 12/1984 | Taylor et al. |
| 4,503,284 A | 3/1985 | Minnick et al. |
| 4,508,251 A | 4/1985 | Harada et al. |
| 4,510,077 A | 4/1985 | Elton ............. 252/502 |
| 4,517,471 A | 5/1985 | Sachs |
| 4,520,287 A | 5/1985 | Wang et al. |
| 4,523,249 A | 6/1985 | Arimoto |
| 4,538,131 A | 8/1985 | Baier et al. |
| 4,546,210 A | 10/1985 | Akiba et al. |
| 4,551,780 A | 11/1985 | Canay |
| 4,557,038 A | 12/1985 | Wcislo et al. |
| 4,560,896 A | 12/1985 | Vogt et al. |
| 4,565,929 A | 1/1986 | Baskin et al. |
| 4,571,453 A | 2/1986 | Takaoka et al. |
| 4,588,916 A | 5/1986 | Lis |
| 4,590,416 A | 5/1986 | Porche et al. |
| 4,594,630 A | 6/1986 | Rabinowitz et al. |
| 4,607,183 A | 8/1986 | Rieber et al. |
| 4,615,109 A | 10/1986 | Wcislo et al. |
| 4,615,778 A | 10/1986 | Elton |
| 4,618,795 A | 10/1986 | Cooper et al. |
| 4,619,040 A | 10/1986 | Wang et al. |
| 4,622,116 A * | 11/1986 | Elton et al. ............ 204/181.1 |
| 4,633,109 A | 12/1986 | Feigel |
| 4,650,924 A | 3/1987 | Kauffman et al. |
| 4,652,963 A | 3/1987 | Fahlen |
| 4,656,316 A | 4/1987 | Meltsch |
| 4,656,379 A | 4/1987 | McCarty |
| 4,677,328 A | 6/1987 | Kumakura |
| 4,687,882 A | 8/1987 | Stone et al. |
| 4,692,731 A | 9/1987 | Osinga |
| 4,723,083 A | 2/1988 | Elton |
| 4,723,104 A | 2/1988 | Rohatyn |
| 4,724,345 A | 2/1988 | Elton et al. |
| 4,732,412 A | 3/1988 | van der Linden et al. |
| 4,737,704 A | 4/1988 | Kalinnikov et al. |
| 4,745,314 A | 5/1988 | Nakano |
| 4,761,602 A | 8/1988 | Leibovich |
| 4,766,365 A | 8/1988 | Bolduc et al. |
| 4,771,168 A | 9/1988 | Gundersen et al. |
| 4,785,138 A | 11/1988 | Breitenbach et al. |
| 4,795,933 A | 1/1989 | Sakai |
| 4,827,172 A | 5/1989 | Kobayashi |
| 4,845,308 A | 7/1989 | Womack, Jr. et al. |
| 4,847,747 A | 7/1989 | Abbondanti |
| 4,853,565 A | 8/1989 | Elton et al. ............ 310/45 |
| 4,859,810 A | 8/1989 | Cloetens et al. |
| 4,859,989 A | 8/1989 | McPherson |
| 4,860,430 A | 8/1989 | Raschbichler et al. |
| 4,864,266 A | 9/1989 | Feather et al. |
| 4,883,230 A | 11/1989 | Lindstrom |
| 4,890,040 A | 12/1989 | Gundersen |
| 4,894,284 A | 1/1990 | Yamanouchi et al. |
| 4,914,386 A | 4/1990 | Zocholl |
| 4,918,347 A | 4/1990 | Takaba |
| 4,918,835 A | 4/1990 | Raschbichler et al. |
| 4,924,342 A | 5/1990 | Lee |
| 4,926,079 A | 5/1990 | Niemela et al. |
| 4,942,326 A | 7/1990 | Butler, III et al. |
| 4,949,001 A | 8/1990 | Campbell |
| 4,982,147 A | 1/1991 | Lauw |
| 4,994,952 A | 2/1991 | Silva et al. |
| 4,997,995 A | 3/1991 | Simmons et al. |
| 5,012,125 A | 4/1991 | Conway |
| 5,030,813 A | 7/1991 | Stanisz |
| 5,036,165 A | 7/1991 | Elton et al. ........... 174/120 SC |
| 5,036,238 A | 7/1991 | Tajima |
| 5,066,881 A | 11/1991 | Elton et al. ............ 310/213 |
| 5,067,046 A | 11/1991 | Elton et al. ............ 361/220 |
| 5,083,360 A | 1/1992 | Valencic et al. |
| 5,086,246 A | 2/1992 | Dymond et al. |
| 5,091,609 A | 2/1992 | Sawada et al. |
| 5,094,703 A | 3/1992 | Takaoka et al. |
| 5,095,175 A | 3/1992 | Yoshida et al. |
| 5,097,241 A | 3/1992 | Smith et al. |
| 5,097,591 A | 3/1992 | Wcislo et al. |
| 5,111,095 A | 5/1992 | Hendershot |
| 5,124,607 A | 6/1992 | Rieber et al. |
| 5,136,459 A | 8/1992 | Fararooy |
| 5,140,290 A | 8/1992 | Dersch |
| 5,153,460 A | 10/1992 | Bovino et al. |
| 5,168,662 A | 12/1992 | Nakamura et al. |
| 5,171,941 A | 12/1992 | Shimizu et al. |
| 5,182,537 A | 1/1993 | Thuis |
| 5,187,428 A | 2/1993 | Hutchison et al. |

| | | | | | |
|---|---|---|---|---|---|
| 5,231,249 A | 7/1993 | Kimura et al. | DE | 584639 | 9/1933 |
| 5,235,488 A | 8/1993 | Koch | DE | 586121 | 10/1933 |
| 5,246,783 A | 9/1993 | Spenadel et al. | DE | 604972 | 11/1934 |
| 5,264,778 A | 11/1993 | Kimmel et al. | DE | 629301 | 4/1936 |
| 5,287,262 A | 2/1994 | Klein | DE | 673545 | 3/1939 |
| 5,304,883 A | 4/1994 | Denk | DE | 719009 | 3/1942 |
| 5,305,961 A | 4/1994 | Errard et al. | DE | 846583 | 8/1952 |
| 5,321,308 A | 6/1994 | Johncock | DE | 875227 | 4/1953 |
| 5,323,330 A | 6/1994 | Asplund et al. | DE | 975999 | 1/1963 |
| 5,325,008 A | 6/1994 | Grant | DE | 1465719 | 5/1969 |
| 5,325,259 A | 6/1994 | Paulsson | DE | 1807391 | 5/1970 |
| 5,327,637 A | 7/1994 | Britenbach et al. | DE | 2050674 | 5/1971 |
| 5,341,281 A | 8/1994 | Skibinski | DE | 1638176 | 6/1971 |
| 5,343,139 A | 8/1994 | Gyugyi et al. | DE | 2155371 | 5/1973 |
| 5,355,046 A | 10/1994 | Weigelt | DE | 2400698 | 7/1975 |
| 5,365,132 A | 11/1994 | Hann et al. | DE | 2520511 | 11/1976 |
| 5,387,890 A | 2/1995 | Estop et al. | DE | 2656389 | 6/1978 |
| 5,397,513 A | 3/1995 | Steketee, Jr. | DE | 2721905 | 11/1978 |
| 5,399,941 A | 3/1995 | Grothaus et al. | DE | 2824951 | 12/1979 |
| 5,400,005 A | 3/1995 | Bobry | DE | 2835386 | 2/1980 |
| 5,408,169 A | 4/1995 | Jeanneret | DE | 2839517 | 3/1980 |
| 5,449,861 A | 9/1995 | Fujino et al. | DE | 2854520 | 6/1980 |
| 5,452,170 A | 9/1995 | Ohde et al. | DE | 3009102 | 9/1980 |
| 5,468,916 A | 11/1995 | Litenas et al. | DE | 2913697 | 10/1980 |
| 5,499,178 A | 3/1996 | Mohan | DE | 2920478 | 12/1980 |
| 5,500,632 A | 3/1996 | Halser, III | DE | 3028777 | 3/1981 |
| 5,510,942 A | 4/1996 | Bock et al. | DE | 2939004 | 4/1981 |
| 5,530,307 A | 6/1996 | Horst | DE | 3006382 | 8/1981 |
| 5,533,658 A | 7/1996 | Benedict et al. | DE | 3008818 | 9/1981 |
| 5,534,754 A | 7/1996 | Poumey | DE | 209313 | 4/1984 |
| 5,545,853 A | 8/1996 | Hildreth | DE | 3305225 | 8/1984 |
| 5,550,410 A | 8/1996 | Titus | DE | 3309051 | 9/1984 |
| 5,583,387 A | 12/1996 | Takeuchi et al. | DE | 3441311 | 5/1986 |
| 5,587,126 A | 12/1996 | Steketee, Jr. | DE | 3543106 | 6/1987 |
| 5,598,137 A | 1/1997 | Alber et al. | DE | 2917717 | 8/1987 |
| 5,607,320 A | 3/1997 | Wright | DE | 3612112 | 10/1987 |
| 5,612,510 A | 3/1997 | Hildreth | DE | 3726346 | 2/1989 |
| 5,663,605 A | 9/1997 | Evans et al. | DE | 3925337 | 2/1991 |
| 5,672,926 A | 9/1997 | Brandes et al. | DE | 4023903 | 11/1991 |
| 5,689,223 A | 11/1997 | Demarmels et al. | DE | 4022476 | 1/1992 |
| 5,807,447 A | 9/1998 | Forrest | DE | 4233558 | 3/1994 |
| 5,834,699 A | 11/1998 | Buck et al. | DE | 4402184 | 8/1995 |
| | | | DE | 4409794 | 8/1995 |
| | FOREIGN PATENT DOCUMENTS | | DE | 4412761 | 10/1995 |
| CH | SU 646403 | 2/1979 | DE | 4420322 | 12/1995 |
| CH | 657482 | 8/1986 | DE | 19620906 | 1/1996 |
| CH | SU 1189322 | 10/1986 | DE | 4438186 | 5/1996 |
| DD | DD137164 | 8/1979 | DE | 19020222 | 3/1997 |
| DD | DD138840 | 11/1979 | DE | 19547229 | 6/1997 |
| DE | 40414 | 8/1887 | DE | 468827 | 7/1997 |
| DE | 134022 | 12/1901 | EP | 049104 | 4/1982 |
| DE | 277012 | 7/1914 | EP | 0493704 | 4/1982 |
| DE | 336418 | 6/1920 | EP | 0056580 A1 | 7/1982 |
| DE | 372390 | 3/1923 | EP | 078908 | 5/1983 |
| DE | 386561 | 12/1923 | EP | 0120154 | 10/1984 |
| DE | 387973 | 1/1924 | EP | 0130124 | 1/1985 |
| DE | 406371 | 11/1924 | EP | 0142813 | 5/1985 |
| DE | 425551 | 2/1926 | EP | 0155405 | 9/1985 |
| DE | 426793 | 3/1926 | EP | 0102513 | 1/1986 |
| DE | 432169 | 7/1926 | EP | 0174783 | 3/1986 |
| DE | 433749 | 9/1926 | EP | 0185788 | 7/1986 |
| DE | 435608 | 10/1926 | EP | 0277358 | 8/1986 |
| DE | 435609 | 10/1926 | EP | 0234521 | 9/1987 |
| DE | 441717 | 3/1927 | EP | 0244069 | 11/1987 |
| DE | 443011 | 4/1927 | EP | 0246377 | 11/1987 |
| DE | 460124 | 5/1928 | EP | 0265868 | 5/1988 |
| DE | 482506 | 9/1929 | EP | 0274691 | 7/1988 |
| DE | 501181 | 7/1930 | EP | 0280759 | 9/1988 |
| DE | 523047 | 4/1931 | EP | 0282876 | 9/1988 |
| DE | 568508 | 1/1933 | EP | 0309096 | 3/1989 |
| DE | 572030 | 3/1933 | EP | 0314860 | 5/1989 |

| | | | | | | |
|---|---|---|---|---|---|---|
| EP | 0316911 | 5/1989 | | GB | 965741 | 8/1964 |
| EP | 0317248 | 5/1989 | | GB | 992249 | 5/1965 |
| EP | 0335430 | 10/1989 | | GB | 1024583 | 3/1966 |
| EP | 0342554 | 11/1989 | | GB | 1053337 | 12/1966 |
| EP | 0221404 | 5/1990 | | GB | 1059123 | 2/1967 |
| EP | 0375101 | 6/1990 | | GB | 1103098 | 2/1968 |
| EP | 0406437 | 1/1991 | | GB | 1103099 | 2/1968 |
| EP | 0439410 | 7/1991 | | GB | 1117401 | 6/1968 |
| EP | 0440865 | 8/1991 | | GB | 1135242 | 12/1968 |
| EP | 0469155 A1 | 2/1992 | | GB | 1147049 | 4/1969 |
| EP | 0490705 | 6/1992 | | GB | 1157885 | 7/1969 |
| EP | 0503817 | 9/1992 | | GB | 1174659 | 12/1969 |
| EP | 0571155 | 11/1993 | | GB | 1236082 | 6/1971 |
| EP | 0620570 | 10/1994 | | GB | 1268770 | 3/1972 |
| EP | 0620630 | 10/1994 | | GB | 1319257 | 6/1973 |
| EP | 0642027 | 3/1995 | | GB | 1322433 | 7/1973 |
| EP | 0671632 | 9/1995 | | GB | 1340983 | 12/1973 |
| EP | 0676777 | 10/1995 | | GB | 1341050 | 12/1973 |
| EP | 0677915 | 10/1995 | | GB | 1365191 | 8/1974 |
| EP | 0684679 | 11/1995 | | GB | 1395152 | 5/1975 |
| EP | 0684682 | 11/1995 | | GB | 1424982 | 2/1976 |
| EP | 0695019 | 1/1996 | | GB | 1426594 | 3/1976 |
| EP | 0732787 | 9/1996 | | GB | 1438610 | 6/1976 |
| EP | 0738034 | 10/1996 | | GB | 1445284 | 8/1976 |
| EP | 0739087 A2 | 10/1996 | | GB | 1479904 | 7/1977 |
| EP | 0740315 | 10/1996 | | GB | 1493163 | 11/1977 |
| EP | 0749190 A2 | 12/1996 | | GB | 1502938 | 3/1978 |
| EP | 0751605 | 1/1997 | | GB | 1525745 | 9/1978 |
| EP | 0739087 A3 | 3/1997 | | GB | 2000625 | 1/1979 |
| EP | 0749193 A3 | 3/1997 | | GB | 1548633 | 7/1979 |
| EP | 0780926 | 6/1997 | | GB | 2046142 | 11/1979 |
| EP | 0802542 | 10/1997 | | GB | 2022327 | 12/1979 |
| EP | 0913912 A1 | 5/1999 | | GB | 2025150 | 1/1980 |
| FR | 805544 | 4/1936 | | GB | 2034101 | 5/1980 |
| FR | 841351 | 1/1938 | | GB | 1574796 | 9/1980 |
| FR | 847899 | 12/1938 | | GB | 2070341 | 9/1981 |
| FR | 916959 | 12/1946 | | GB | 2070470 | 9/1981 |
| FR | 1011924 | 4/1949 | | GB | 2071433 | 9/1981 |
| FR | 1126975 | 3/1955 | | GB | 2081523 | 2/1982 |
| FR | 1238795 | 7/1959 | | GB | 2099635 | 12/1982 |
| FR | 2108171 | 5/1972 | | GB | 2105925 | 3/1983 |
| FR | 2251938 | 6/1975 | | GB | 2106306 | 4/1983 |
| FR | 2305879 | 10/1976 | | GB | 2106721 | 4/1983 |
| FR | 2376542 | 7/1978 | | GB | 2136214 | 9/1984 |
| FR | 2467502 | 4/1981 | | GB | 2140195 | 11/1984 |
| FR | 2481531 | 10/1981 | | GB | 2150153 | 6/1985 |
| FR | 2556146 | 6/1985 | | GB | 2268337 | 1/1994 |
| FR | 2594271 | 8/1987 | | GB | 2273819 | 6/1994 |
| FR | 2708157 | 1/1995 | | GB | 2283133 | 4/1995 |
| GB | 123906 | 3/1919 | | GB | 2289992 | 12/1995 |
| GB | 268271 | 3/1927 | | GB | 2308490 | 6/1997 |
| GB | 293861 | 11/1928 | | GB | 2332557 | 6/1999 |
| GB | 292999 | 4/1929 | | HU | 175494 | 11/1981 |
| GB | 319313 | 7/1929 | | JP | 60206121 | 3/1959 |
| GB | 468827 | * 7/1937 ................. 310/215 | | JP | 57043529 | 8/1980 |
| GB | 518993 | 3/1940 | | JP | 57126117 | 5/1982 |
| GB | 537609 | 6/1941 | | JP | 59076156 | 10/1982 |
| GB | 540456 | 10/1941 | | JP | 59159642 | 2/1983 |
| GB | 589071 | 6/1947 | | JP | 6264964 | 9/1985 |
| GB | 666883 | 2/1952 | | JP | 1129737 | 5/1989 |
| GB | 685416 | 1/1953 | | JP | 62320631 | 6/1989 |
| GB | 702892 | 1/1954 | | JP | 2017474 | 1/1990 |
| GB | 715226 | 9/1954 | | JP | 3245748 | 2/1990 |
| GB | 723457 | 2/1955 | | JP | 4179107 | 11/1990 |
| GB | 739962 | 11/1955 | | JP | 318253 | 1/1991 |
| GB | 763761 | 12/1956 | | JP | 424909 | 1/1992 |
| GB | 805721 | 12/1958 | | JP | 5290947 | 4/1992 |
| GB | 827600 | 2/1960 | | JP | 6196343 | 12/1992 |
| GB | 854728 | 11/1960 | | JP | 6233442 | 2/1993 |
| GB | 870583 | 6/1961 | | JP | 6325629 | 5/1993 |
| GB | 913386 | 12/1962 | | JP | 7057951 | 8/1993 |

| | | | | | | |
|---|---|---|---|---|---|---|
| JP | 7264789 | 3/1994 | | WO | WO9745930 | 12/1997 |
| JP | 8167332 | 12/1994 | | WO | WO9745931 | 12/1997 |
| JP | 7161270 | 6/1995 | | WO | WO9745932 | 12/1997 |
| JP | 8264039 | 11/1995 | | WO | WO9745933 | 12/1997 |
| JP | 9200989 | 1/1996 | | WO | WO9745934 | 12/1997 |
| JP | 8036952 | 2/1996 | | WO | WO9745935 | 12/1997 |
| JP | 8167360 | 6/1996 | | WO | WO9745936 | 12/1997 |
| LU | 67199 | 3/1972 | | WO | WO9745937 | 12/1997 |
| SE | 90308 | 9/1937 | | WO | WO9745938 | 12/1997 |
| SE | 305899 | 11/1968 | | WO | WO9745939 | 12/1997 |
| SE | 255156 | 2/1969 | | WO | WO9747067 | 12/1997 |
| SE | 341428 | 12/1971 | | WO | WO9820595 | 5/1998 |
| SE | 453236 | 1/1982 | | WO | WO9820596 | 5/1998 |
| SE | 457792 | 6/1987 | | WO | WO9820597 | 5/1998 |
| SE | 502417 | 12/1993 | | WO | WO 98/20598 | 5/1998 |
| SU | 792302 | 1/1971 | | WO | WO9820600 | 5/1998 |
| SU | 425268 | 9/1974 | | WO | WO 98/20602 | 5/1998 |
| SU | 1019553 | 1/1980 | | WO | WO9821385 | 5/1998 |
| SU | 694939 | 1/1982 | | WO | PCT/FR 98/00468 | 6/1998 |
| SU | 955369 | 8/1983 | | WO | WO9827634 | 6/1998 |
| SU | 1511810 | 5/1987 | | WO | WO9827635 | 6/1998 |
| WO | WO8202617 | 8/1982 | | WO | WO9827636 | 6/1998 |
| WO | WO8502302 | 5/1985 | | WO | WO9829927 | 7/1998 |
| WO | WO9011389 | 10/1990 | | WO | WO9829928 | 7/1998 |
| WO | WO9012409 | 10/1990 | | WO | WO9829929 | 7/1998 |
| WO | PCT/DE 90/00279 | 11/1990 | | WO | WO9829930 | 7/1998 |
| WO | WO9101059 | 1/1991 | | WO | WO9829931 | 7/1998 |
| WO | WO9101585 | 2/1991 | | WO | WO9829932 | 7/1998 |
| WO | WO9107807 | 3/1991 | | WO | WO9833731 | 8/1998 |
| WO | PCT SE 91/00077 | 4/1991 | | WO | WO9833736 | 8/1998 |
| WO | WO9109442 | 6/1991 | | WO | WO9833737 | 8/1998 |
| WO | WO 91/11841 | 8/1991 | | WO | WO9834238 | 8/1998 |
| WO | WO8115862 | 10/1991 | | WO | WO 98/34239 | 8/1998 |
| WO | WO 91/15755 | 10/1991 | | WO | WO9834240 | 8/1998 |
| WO | WO9201328 | 1/1992 | | WO | WO9834241 | 8/1998 |
| WO | WO9203870 | 3/1992 | | WO | WO9834242 | 8/1998 |
| WO | WO9321681 | 10/1993 | | WO | WO9834243 | 8/1998 |
| WO | WO9406194 | 3/1994 | | WO | WO9834244 | 8/1998 |
| WO | WO9518058 | 7/1995 | | WO | WO9834245 | 8/1998 |
| WO | WO9522153 | 8/1995 | | WO | WO9834246 | 8/1998 |
| WO | WO9524049 | 9/1995 | | WO | WO9834247 | 8/1998 |
| WO | WO9622606 | 7/1996 | | WO | WO9834248 | 8/1998 |
| WO | WO9622607 | 7/1996 | | WO | WO9834249 | 8/1998 |
| WO | PCT/CN 96/00010 | 10/1996 | | WO | WO9834250 | 8/1998 |
| WO | WO9630144 | 10/1996 | | WO | WO9834309 | 8/1998 |
| WO | WO9710640 | 3/1997 | | WO | WO9834312 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | WO45908 | 12/1997 | | WO | WO9834325 | 8/1998 |
| WO | WO9745288 | 12/1997 | | WO | WO9834326 | 8/1998 |
| WO | WO9745847 | 12/1997 | | WO | WO9834327 | 8/1998 |
| WO | WO9745848 | 12/1997 | | WO | WO9834328 | 8/1998 |
| WO | WO9745906 | 12/1997 | | WO | WO9834329 | 8/1998 |
| WO | WO9745907 | 12/1997 | | WO | WO9834330 | 8/1998 |
| WO | WO9745912 | 12/1997 | | WO | WO9834331 | 8/1998 |
| WO | WO9745914 | 12/1997 | | WO | WO 98/4062 | 9/1998 |
| WO | WO9745915 | 12/1997 | | WO | WO9834315 | 10/1998 |
| WO | WO9745916 | 12/1997 | | WO | WO 98/43536 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |
| WO | WO9745928 | 12/1997 | | WO | WO9917426 | 4/1999 |
| WO | WO9745929 | 12/1997 | | WO | WO9917427 | 4/1999 |

| | | |
|---|---|---|
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Submersible Motors and Wet–Rotor Motors for Centrifugal Pumps Submerged in the Fluid Handled; K.. Bienick, KSB; Feb. 25, 1988; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug. 1931; pp2–3.

Problems in design of the 110–5OokV high–voltage generators; Nikiti et al; World Electrotechnical Congress; Jun. 21–27, 1977; Section 1. Paper #18.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1—11; G. Aichholzer.

Optimizing designs of water–resistant magnet wire; V. Kuzenev et al; Elektrotekhnika, vol. 59, No. 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen—ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al; No. 1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer; Sep. 1974, pp249–255.

Advanced Turbine–generators– an assessment; A. Appleton, et al; International Conf. Proceedings, Lg HV Elec. Sys. Paris, FR, Aug.–Sep. 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

POWERFORMER ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9, Sep. 1989.

A study of equipment sizes and constraints for a unified power flow controller; J Bian et al; IEEE 1996.

P. Marti and R. Schuler, "Manufacturing and Testing of Roebel Bars".

M. Ichihara and F. Fukasawa, "An EHV Bulk Power Transmission Line Made with Low Loss XLPE Cable," Aug. 1992, *Hitachi Cable Review*, No. 11, pp. 3–6.

*Underground Transmission Systems Reference Book*, 1992 Edition, prepared by Power Technologies, Inc. for Electric Power Research Institute (title page).

P. Kundur, "Power System Stability and Control," *Electric Power Research Institute Power System Engineering Series*, McGraw–Hill, Inc.

R. F. Schiferl and C. M. Ong, "Six Phase Synchronous Machine with AC and DC Stator Connections, Part II: Harmonic Studies and a Proposed Uninterruptible Power Supply Scheme", *IEEE Transactions on Power Apparatus and Systems*, vol. PAS–102, No. 8, Aug. 1983, pp. 2694–2701.

R. F. Schiferl and C. M. Ong, "Six Phase Synchronous Machine with AC and DC Stator Connections, Part I: Equivalent Circuit Representation and Steady–State Analysis", *IEEE Transactions on Power Apparatus and Systems*, vol. PAS–102, No. 8, Aug. 1983, pp. 2685–2693.

T. Petersson, *Reactive Power Compensation*, Abb Power Systems AB, Dec. 1993.

"Different types of Permanent Magnet Rotors", a summary by ABB Corporate Research, Nov. 1997.

K. Binns, Permanent Magnet Machines, *Handbook of Electric Machines*, Chapter 9, McGraw Hill, 1987, pp. 9–1–9–25.

Low–intensy laser–triggering of rail–gaps with magnesium–aerosol switching–gases; W. Frey; 11th International Pulse Power Conference, 1997, Baltimore, USA Digest of Technical Papers, p. 322–327.

Manufacture and Testing of Roebel bars; P. Marti et al; 1960, Pub.86, vol. 8, pp 25–31.

Direct Generation of alternating current at high voltages; R. Parsons; 4/29 IEEE Journal, vol. 67 #393, pp1065–1080.

An EHV bulk Power transmission line Made with Low Loss XLPE Cable; Ichihara et al.

Underground Transmission Systems Reference Book.

Power System Stability and Control; P. Kundur.

Six phase Synchronous Machine with AC and DC Stator Connections, Part II:Harmonic Studies and a proposed Uninterruptible Power Supply Scheme; R. Schiferl et al.

Six phase Synchronous Machine with AC and DC Stator Connections, Part 1: Equivalent circuit representation and Steady–State Analysis; R. Schiferl et al.

Reactive Power Compensation; T. Petersson.

Different Types of Permanent Magnet Rotors.

Permanent Magnet Machines; K. Binns.

Development of extruded polymer insulated superconducting cable.

A test installation of a self–tuned ac filter in the Konti–Skan 2 HVDC link; T. Holmgren,G. Asplund, S. Valdemarsson, P. Hidman of ABB; U. Jonsson of Sv nska Kraftnat; O. I of of Vattenfall Vastsverige AB; IEEE Stockholm Power Tech Conference Jun. 1995, pp 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika* , 1970, pp 6–8.

J&P Transformer Book 11$^{th}$ Edition;A. C. Franklin et al; owned by Butterworth—Heinemann Ltd. Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters: Main Characteristics and Comparative Advantages; J.Arrillaga et al; *Electra* No. 149, Aug. 1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Us of Asynchronized Machines in Power Systems*; N.I.Blotskii t al; *Elektrichestvo*, No. 12, 1–6, 1985, pp 90–99.

Variable–speed switched reluctance motors; P.J. Lawrenson et al; IEE proc, vol. 127, F.L.B. No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O. Toennesen; Nordic Insulation Symposium, Bergen, 1996, pp 425–432.

MPTC: An economical alternative to universal power flow controllers;N. Mohan; EPE 1997, Trondheim, pp 3. 1027–3. 1030.

Lexikon der Technik; Luger; Band 2, Grundlagen der Elektrotechnik und Kerntechnik, 1960, pp 395.

Das Handbuch der Lokomotiven (hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger, Elkrafthandboken, Elmaskiner 1996, 15–20.

Power Electronics—in Theory and Practice; K. Thorborg; ISBN 0–86238–341–2, 1993, pp 1–13.

Regulating transformers in power systems– new concepts and applications; E. Wirth et al; ABB Review Apr. 1997, p 12–20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivity to electric motor design; J.S. Edmonds et al; IEEE Transactions on Energy Conversion Jun. 1992, No. 2, pp 322–329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan, No. 63*; 1977, pp 6–14.

Weatherability of Polymer–Modified Mortars after Ten–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update* ,vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

* cited by examiner

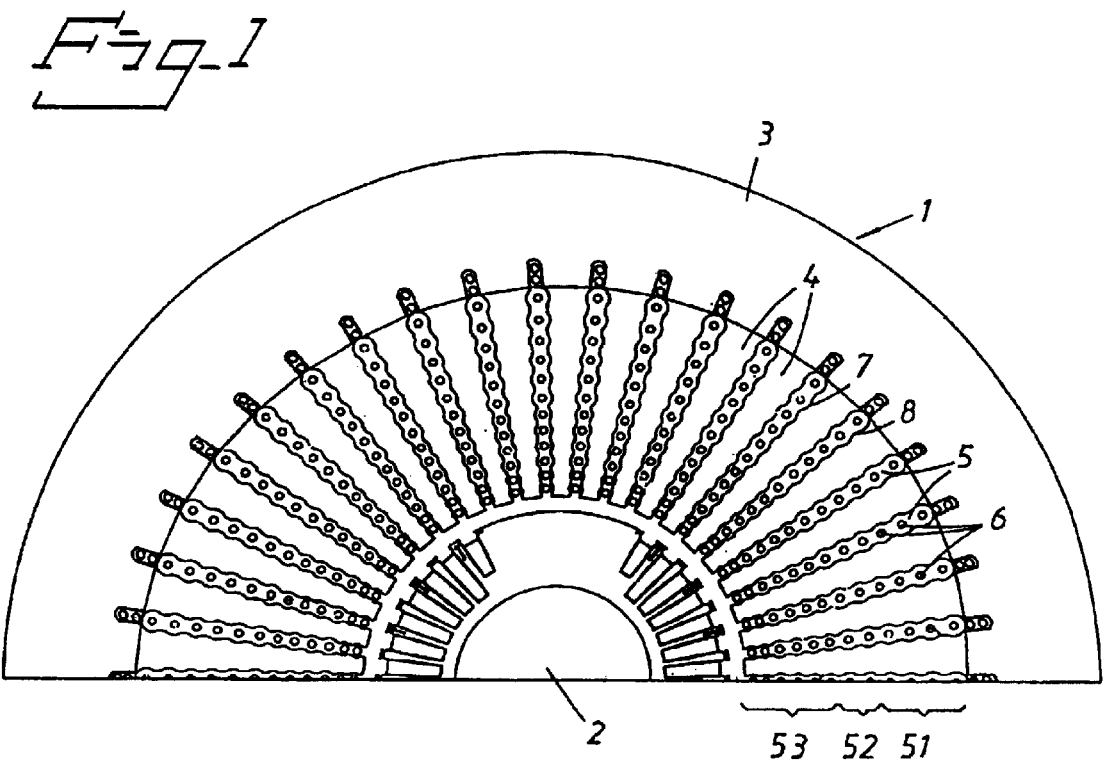
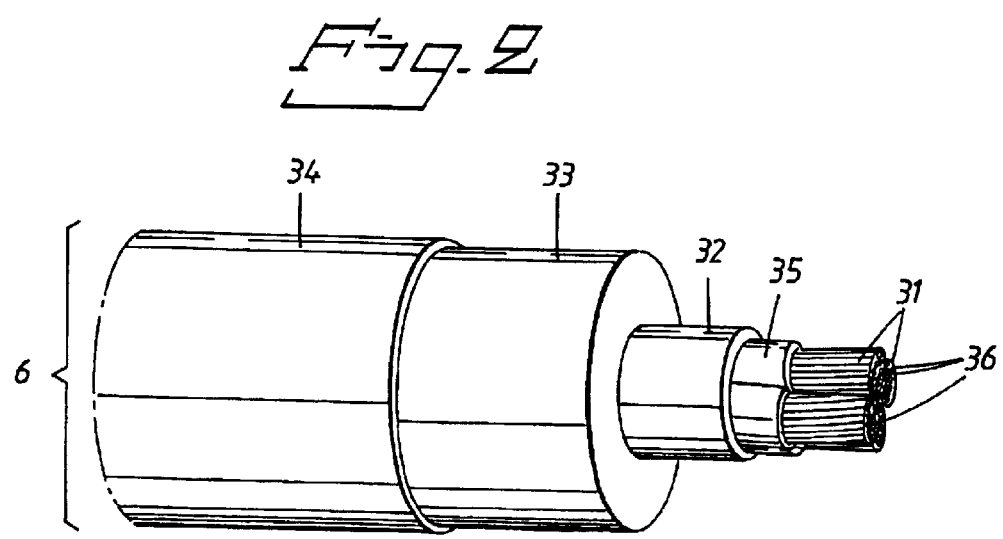

HIGH VOLTAGE PLANTS WITH ELECTRIC MOTORS

TECHNICAL FIELD

The present invention relates to electric plants comprising motors intended for connection to distribution or transmission networks, hereinafter termed power networks. The invention relates secondly to a motor intended for use in such a plant. The motors may be either synchronous or asynchronous motors.

The plant with electric motors may be a rolling mill, paper mill, pulp drying machine, mine plant, quay structure, fan, pump or compressor systems, hoisting means, traverse, crane, centrifuge, conveyor, workshop plant, steel mills, etc. Plants with electric motors shall thus be understood in their widest sense.

BACKGROUND ART

The magnetic circuits in electric motors usually comprise a laminated core, e.g. of sheet steel with a welded construction. To provide ventilation and cooling the core is often divided into stacks with radial and/or axial ventilation ducts. For larger motors the laminations are punched out in segments which are attached to the frame of the machine, the laminated core being held together by pressure fingers and pressure rings. The winding is disposed in slots in the laminated core, the slots generally having a cross section in the shape of a rectangle or trapezium.

In multi-phase electric motors the windings are made as either single or double layer windings. With single layer windings there is only one coil side per slot, whereas with double layer windings there are two coil sides per slot. By coil side is meant one or more conductors combined vertically or horizontally and provided with a common coil insulation, i.e. an insulation designed to withstand the rated voltage of the motor to earth.

Double-layer windings are generally made as diamond windings whereas single layer windings in the present context can be made as diamond or flat windings. Only one (possibly two) coil width exists in diamond windings whereas flat windings are made as concentric windings, i.e. with widely varying coil width. By coil width is meant the distance in arc dimension between two coil sides pertaining to the same coil.

Normally all large motors are made with double-layer winding and coils of the same size. Each coil is placed with one side in one layer and the other side in the other layer. This means that all coils cross each other in the coil end. If there are more than two layers these crossings complicate the winding work and the coil end is less satisfactory.

It is considered that coils for rotating electric motors can be manufactured with good results up to a voltage range of 10–20 kV.

Large alternating current motors are divided into synchronous and asynchronous motors, the former generally covering a higher power range up to a few tens of MW and being constructed to be supplied with a voltage of normally maximally 20 kV. The synchronous motor operates with a rotor speed that is synchronous with the network frequency. In an asynchronous motor the magnetic field rotates faster than the rotor so that the induced currents will provide torque in the direction of rotation. The two types of motors are to a great extent similar in construction. They consist of a stator with a rotor placed inside the stator. The stator is built up of a laminated core with slots punched out for the winding. The stator is placed in a bottom box attached to the foundation by its feet. The rotor is suspended in bearings mounted on the box. A stator shell is placed on the bottom box to protect the active parts. The shell is provided with openings for cooling air to enter.

The function of an alternating current motor is based on interaction between magnetic fields, electric currents and mechanical motion. The magnetic fields are localized primarily in the iron of the machine and the electric currents are localized in the windings.

A distinction is made between two main types of alternating current motors: synchronous and asynchronous machines. The principal difference between synchronous and asynchronous machines is how the torque is produced. A synchronous motor is excited by supplying energy to the rotor from the outside via brushless exciters or slip rings, whereas an asynchronous motor obtains its excitation energy from the stator current through induction. The speed of the synchronous motor is therefore not as dependent on load as in the asynchronous motor.

Depending on the construction of the rotor, there are two types of synchronous motors: those with salient poles and those with a cylindrical rotor. In high-speed 2-pole operation the mechanical stresses on the rotor will be extremely high and in that case it is favourable to use a cylindrical rotor. For motors with lower speeds, four-pole or more, the rotor diameter will be larger. In view of the lower speed and thus correspondingly lower mechanical stresses, it is more favourable for the rotor to have salient poles.

The boundary between the two types is indefinite. At higher power and with four poles, cylindrical rotors are used that are long and slim in shape. At lower power and with four poles, rotors with salient poles are used.

Asynchronous motors are also divided into two types: squirrel-cage induction motors or slip ring motors. Common to both types is that the rotor is built up of laminations with slots for the rotor winding. The difference is in the construction of the winding. The squirrel-cage induction motors have a squirrel-cage winding consisting of axial rods that are short-circuited at the ends with a short-circuiting ring. Asynchronous motors with slip rings have a three-phase winding in the rotor with phase terminals connected to the slip rings.

By designing the rotor slots in various ways the start and operating properties of the squirrel-cage induction motor can be adjusted to various operating requirements. Slip-ring asynchronous motors are primarily used under difficult starting conditions. External resistance can be connected via the slip rings. By increasing the rotor resistance the maximum torque can be moved towards lower speed, thus increasing the start torque. When starting is complete the external start resistance is short-circuited.

The choice of a large alternating current motor as regards to type, nesting class and cooling method, is dependent on the following factors, among others:

Torque characteristic of the load

Type of load and load cycle

Start power restrictions

Network characteristics

Cost of electric energy

Environment where the motor is to be installed

Investment cost in relation to the estimated service life of the plant

The main desire for an electric machine is that its capital cost and running costs shall be as low as possible. It is therefore desirable to keep the efficiency as high as possible at given power factors. The synchronous motor generally has higher efficiency than the asynchronous motor.

The rotor of a synchronous motor is often manufactured with salient poles. Its main use is in the power range of 1

MW to a few tens of MW, e.g. for grinding mills and refiners in the paper industry, for large pumps both in the process industry and in connection with weak networks, e.g. for irrigation installations in desert countries. The oil industry also uses large synchronous motors for pumps and compressors.

The main reason for using synchronous motors instead of the less expensive asynchronous motors is that the synchronous motor produces less stress on the network, in the form of lower start current, and that at over-excitation the synchronous motor can also be used to improve the power factor. Large synchronous motors may also have slightly higher efficiency than equivalent asynchronous motors.

The winding must be insulated, both between the winding turns in the coil and also between coil and surroundings. Various forms of plastic, varnish and glassfibre material are often used as insulating material. The coil ends are braced in order to counteract the forces appearing between the various coils, particularly at short-circuiting.

Motors of the type described above are connected to high-voltage networks of e.g. 145 kV through the use of a transformer which lowers the voltage. The use of a motor in this way, connected to the high-voltage network via a transformer entails a number of drawbacks. Among others the following drawbacks may be mentioned.

the transformer is expensive, increases transport costs and requires space the transformer lowers the efficiency of the system the transformer consumes reactive power a conventional transformer contains oil, with the associated risks involves sensitive operation since the motor, via the transformer, works against a weaker network

DESCRIPTION OF THE INVENTION

An object of the invention is therefore to enable the use of one or more electric motors in a plant which is directly connected to high-voltage supply networks, by which is meant here sub-transmission and distribution networks without intermediate connection of a transformer.

The benefit gained by attaining the above-mentioned object is the avoidance of an intermediate oil-filled transformer, the reactance of which otherwise consumes reactive power.

Thanks to the specially produced solid insulation, the motors in such a plant can be supplied directly with a voltage level considerably in excess of what is possible using known technology, and at a voltage that may reach the highest applicable voltages for high-voltage power networks.

The advantage is thus gained that the transformer becomes superfluous, therefore eliminating all the problems touched upon above that are inherent with a plant in which the voltage must be stepped down, as well as other significant advantages. With a plant according to the invention the overload capacity is also radically increased. This may be +100% for an hour or two, enabling motors with lower rated output to be selected, thereby also saving expense.

Higher output is also obtained through a high voltage on the motors since this is proportional to the voltage squared. The invention thus enables electric motors with higher power to be achieved. The invention thus extends the application area for electric machines to the range 1–300 MW and even enables applications at still higher power levels.

The major and essential difference between known technology and the embodiment according to the invention is thus that this is achieved with a magnetic circuit included in at least one electric motor which is arranged to be directly connected to a high supply voltage via coupling elements such as breakers and isolators. The magnetic circuit thus comprises one or more laminated cores. The winding consists of a threaded cable with one or more permanently insulated conductors having a semiconducting layer both at the conductor and outside the insulation, the outer semiconducting layer being connected to earth potential.

To solve the problems arising with direct connection of electric motors, both rotating and static motors, to all types of high-voltage power networks, at least one motor in the plant according to the invention has a number of features as mentioned above, which differ distinctly from known technology. Additional features and further embodiments are defined in the dependent claims and are discussed in the following.

The features mentioned above and other essential characteristics of the plant and at least one of the electric motors included therein according to the invention, include the following:

The winding is produced from a cable having one or more permanently insulated conductors with a semiconducting layer at both conductor and sheath. Some typical conductors of this type are PEX cable or a cable with EP rubber insulation which, however, for the present purpose are further developed both as regards the strands in the conductor and the nature of the outer sheath. PEX=crosslinked polyethylene (XLPE). EP=ethylene propylene.

Cables with circular cross section are preferred, but cables with some other cross section may be used in order to obtain better packing density, for instance.

Such a cable allows the laminated core to be designed according to the invention in a new and optimal way as regards slots and teeth.

The winding is preferably manufactured with insulation in steps for best utilization of the laminated core.

The winding is preferably manufactured as a multi-layered, concentric cable winding, thus enabling the number of coil-end intersections to be reduced.

The slot design is suited to the cross section of the winding cable so that the slots are in the form of a number of cylindrical openings running axially and/or radially outside each other an having an open waist running between the layers of the stator winding.

The design of the slots is adjusted to the relevant cable cross section and to the stepped insulation of the winding. The stepped insulation allows the magnetic core to have substantially constant tooth width, irrespective of the radial extension.

The above-mentioned further development as regards he strands entails the winding conductors consisting of a number of impacted strata/layers, i.e. insulated strands that from the point of view of an electric machine, are not necessarily correctly transposed, uninsulated and/or insulated from each other.

The above-mentioned further development as regards the outer sheath entails that at suitable points along the length of the conductor, the outer sheath is cut off, each cut partial length being connected directly to earth potential.

The use of a cable of the type described above allows the entire length of the outer sheath of the winding, as well as other parts of the plant, to be kept at earth potential. An important advantage is that the electric field is close to zero within the coil-end region outside the outer semiconducting layer. With earth potential on the outer sheath the electric field need not be controlled. This means that no field concentrations will occur either in the core, in the coil-end regions or in the transition between them.

The mixture of insulated and/or uninsulated impacted strands, or transposed strands, results in low stray losses.

The cable for high voltage used in the winding is constructed of an inner core/conductor with a plurality of strands, at least two semiconducting layers, the innermost being surrounded by an insulating layer, which is in turn surrounded by an outer semiconducting layer having an outer diameter in the order of 10–250 mm and a conductor area in the order of 40–3000 mm$^2$.

If at least one of the motors in the plant according to the invention is constructed in the manner specified, start and control of this motor or these motors can be achieved with the start methods, known per se, described by way of example in the literature discussed in the introduction.

According to a particularly preferred embodiment of the invention, at least two of these layers, preferably all three, have the same coefficient of thermal expansion. The decisive benefit is thus gained that defects, cracks and the like are avoided during thermal movement in the winding.

According to another important preferred embodiment of the invention at least one of the motors in the plant has one or more connection voltages.

Since the insulation system, suitably permanent, is designed so that from the thermal and electrical point of view it is dimensioned for over 36 kV, the plant can be connected to high-voltage power networks without any intermediate step-down transformer, thereby achieving the advantages referred to. Such a plant is preferably, but not necessarily, constructed to include the features defined for plants as claimed in any of claims 1–22.

The above-mentioned and other advantageous embodiments of the invention are defined in the dependent claims.

BRIEF DESCRIPTION OF THE DRAWINGS

The invention will be described in more detail in the following detailed description of a preferred embodiment of the construction of the magnetic circuit of an electric motor in the plant, with reference to the accompanying drawings in which FIG. 1 shows a schematic axial end view of a sector of the stator in an electric motor in the plant according to the invention, FIG. 2 shows an end view, step-stripped, of a cable used in the winding of the stator according to FIG. 1, and FIGS. 3–7 show examples of different start circuits known per se.

DESCRIPTION OF A PREFERRED EMBODIMENT

Figure 3:
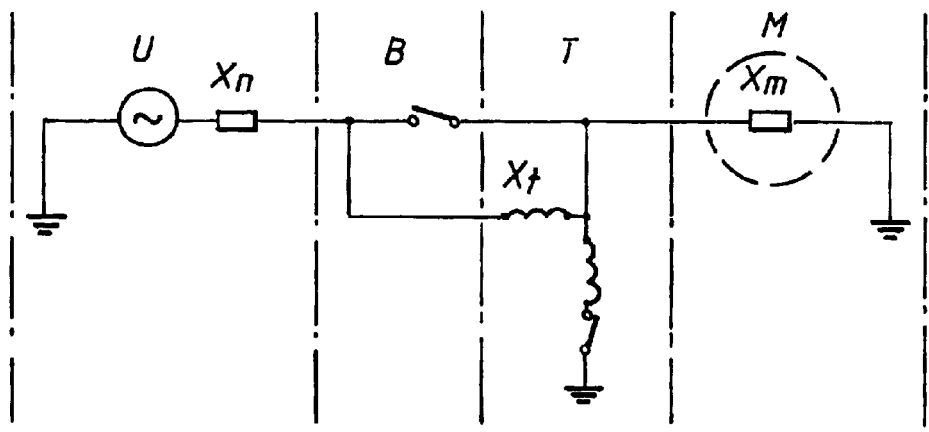

In the schematic axial view through a sector of the stator 1 according to FIG. 1, pertaining to the electric motor or motors included in the plant, the rotor 2 of the motor is also indicated. The stator 1 is composed in conventional manner of a laminated core. FIG. 1 shows a sector of the motor corresponding to one pole pitch. From a yoke part 3 of the core situated radially outermost, a number of teeth 4 extend radially in towards the rotor 2 and are separated by slots 5 in which the stator winding is arranged. Cables 6 forming this stator winding, are high-voltage cables which may be of substantially the same type as those used for power distribution, i.e. PEX cables. One difference is that the outer, mechanically-protective sheath, and the metal screen normally surrounding such power distribution cables are eliminated so that the cable for the present application comprises only the conductor and at least one semiconducting layer on each side of an insulating layer. Thus, the semiconducting layer which is sensitive to mechanical damage lies naked on the surface of the cable.

The cables 6 are illustrated schematically in FIG. 1, only the conducting central part of each cable part or coil side being drawn in. As can be seen, each slot 5 has varying cross section with alternating wide parts 7 and narrow parts 8. The wide parts 7 are substantially circular and surround the cabling, the waist parts between these forming narrow parts 8. The waist parts serve to radially fix the position of each cable. The cross section of the slot 5 also narrows radially inwards. This is because the voltage on the cable parts is lower the closer to the radially inner part of the stator 1 they are situated. Slimmer cabling can therefore be used there, whereas coarser cabling is necessary further out. In the example illustrated cables of three different dimensions are used, arranged in three correspondingly dimensioned sections 51, 52, 53 of slots 5.

FIG. 2 shows a step-wise stripped end view of a high-voltage cable for use in an electric motor according to the present invention. The high-voltage cable 6 comprises one or more conductors 31, each of which comprises a number of strands 36 which together give a circular cross section of copper (Cu), for instance. These conductors 31 are arranged in the middle of the high voltage cable 6 and are surrounded in the embodiment shown by a part insulation 35. However, it is feasible for the part insulation 35 to be omitted on one of the conductors 31. In the present embodiment of the invention the conductors 31 are together surrounded by a first semiconducting layer 32. This semiconducting layer 32 is surrounded by, and in intimate contact with, an insulating layer 33, e.g., PEX insulation, which is in turn surrounded by, and in intimate contact with, a second semiconducting layer 34. Thus the concept "high-voltage cable" in this application need not include any metallic screen or outer sheath of the type that normally surrounds such a cable for power distribution.

Figure 4:
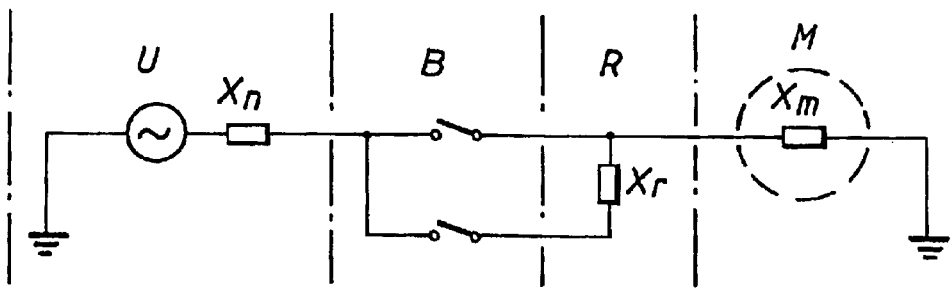
Figure 6:
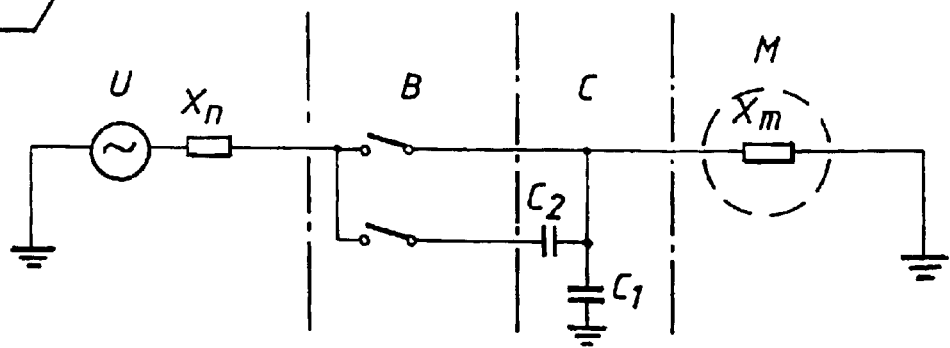
Figure 6:
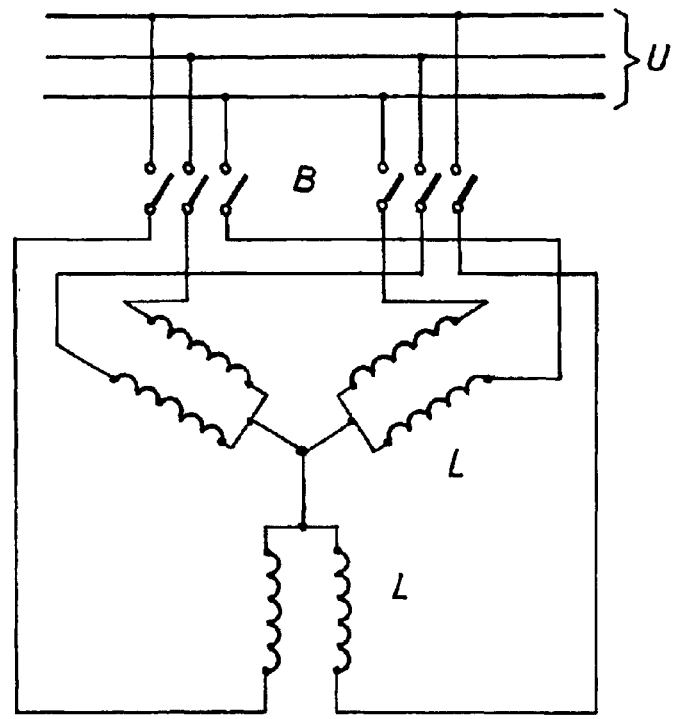
Figure 7:
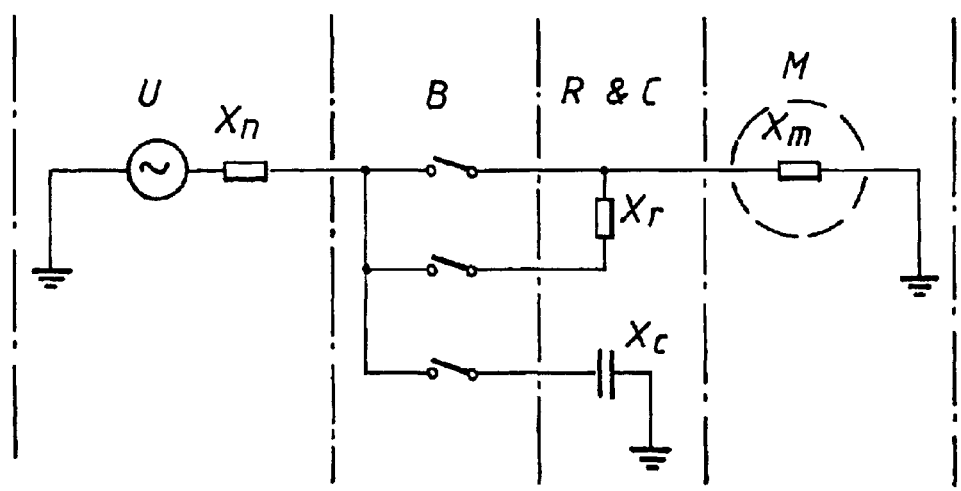

FIGS. 3–7, in the form of basic diagrams, show examples of known start procedures applicable to rotating motors in the plant according to the present invention. The following designations are used in the figures:

U: High-voltage network $X_t$ Transformer impedance
$X_n$ Network impedance R: Reactor
B: Breaker $X_r$ Reactor impedance
M: Motor C: Capacitor
$X_m$ Motor impedance $X_c$ Capacitor Impedance
T: Transformer L: 3-phase stator windings FIG. 3 thus relates to the procedure for transformer start, FIG. 4 to the procedure for reactor start, FIG. 5 to the procedure for part-winding start, FIG. 6 to the procedure for capacitor start, and FIG. 7 to the procedure for combined reactor and capacitor start. Other combinations of start procedures are of course also applicable in the plant according to the invention. The various start procedures are described in the literature, e.g. in the literature references mentioned in the introduction of this application.

Thus, with one or more rotating electric motors constructed in accordance with the invention, industrial plants comprising one or more such motors can be connected directly to high-voltage supply networks, i.e. networks having supply voltages of 20 kV or higher, thereby enabling the eliminated of at least one transformer.

Using permanent insulating power cable according to the invention, between the electric motors included in the plant, and achieving a compact siting of these motors thus ensures that the electric fields are small and bushings/terminals can be entirely eliminated.

What is claimed is:

1. An electric plant for high voltage including one or more motors, each comprising at least one flexible winding, wherein the winding of at least one of the electric motors forms at least one complete uninterrupted turn, said wincing comprising an electrical conductor including a plurality of insulated conductive elements and at least one uninsulated conductive element; and an electric field confining insulation system including an inner semiconducting layer, surrounding and being in electrical contact with the at least one uninsulated conductive element; a solid insulation layer surrounding the inner layer and an outer semiconducting layer surrounding the insulation layer, each semiconducting layer forming an equipotential surface around the conductor.

2. A plant as claimed in claim 1, wherein at least one motor has one or more connection voltages.

3. A plant as claimed in claim 1, wherein at least one of the semiconducting layers has substantially the same coefficient of thermal expansion as the solid insulation.

4. A plant as claimed in claim 1, wherein transformation of substantial power takes place in the same electric motor.

5. A plant as claimed in claim 1, wherein the inner semiconducting layer is at substantially the same potential as the conductor.

6. A plant as claimed in claim 1, wherein said outer semiconducting layer is connected to a predefined potential.

7. A plant as claimed in claim 6, wherein the predefined potential is earth potential.

8. A plant as claimed in claim 1, wherein at least two of said layers have substantially the same coefficient of thermal expansion.

9. A plant as claimed in claim 1, wherein the motor has a stator and said stator is cooled at earth potential by means of a flow of at least one of gas and liquid.

10. A plant as claimed in claim 1, wherein the cable has a conductor area of about 40 and about 3000 mm$^2$ and have an outer cable diameter of about 10 and about 250 mm.

11. A plant as claimed in claim 1, further comprising an electrostatic machine for series connection to the motor for limiting at least one of start current and fault current for the rotating electric motor.

12. A plant as claimed in claim 1, including an impedance and wherein at least one motor has a neutral point earthed via said impedance.

13. A plant as claimed in claim 1, wherein at least one motor has a neutral point directly connected to earth.

14. A plant as claimed in claim 1, wherein at least one motor is operative to produce reactive power with relatively large overload capacity.

15. A plant as claimed in claim 1, wherein at least one motor is connectable to a distribution network or transmission network via coupling elements and without any step-down transforming of the voltage level.

16. A plant as claimed in claim 1, wherein at least one motor is connectable to a distribution network or transmission network having a supply voltage in excess of 36 kV.

17. A plant as claimed in claim 1, wherein the winding of at least one motor is adapted for self-regulating field control free of auxiliary means for control of the field.

18. A plant as claimed in claim 1, wherein at least one motor includes a stator winding divided into two parts in order to achieve partial winding start.

19. A plant as claimed in claim 1, wherein at least one motor has one or more connection voltages.

20. The plant of claim 1, wherein at least one motor is operable free of partial discharge and field control.

21. A plant for high voltage electric including a motor including at least one flexible winding, wherein said winding comprises a cable including as least one current-carrying conductor and a magnetically permeable, electric field confining cover surrounding the conductor including an inner layer of semiconducting material surrounding the conductor, a solid insulating layer surrounding the inner layer, and an outer layer of semiconducting material surrounding the insulating layer, the conductor including a plurality of insulated conductive elements and at least one uninsulated conductive element in contact with the inner layer, said cable forming at least one uninterrupted turn in the corresponding winding of said machine.

22. The plant of claim 21, wherein the outer layer has a conductivity sufficient to establish an equipotential surface around the conductor.

23. The plant of claim 21, wherein the inner layer, the solid insulating layer and the outer layer are substantially free of cracks.

24. The plant of claim 21, wherein the layers of the cover have substantially the same temperature coefficient of expansion.

25. The plant of claim 21, wherein the machine is operable at 100% overload for two hours.

26. The plant of claim 21, wherein motor has coil end regions without an electric field outside of the cable, such that the cable is operable free of sensible end winding loss.

27. The plant of claim 21, wherein the winding comprises multiple uninterrupted turns.

28. The plant of claim 21, wherein the cable comprises a transmission line.

29. The plant of claim 21 being operable above 36 kV.

30. An electric plant for high voltage including at least one motor comprising at least on flexible winding in the form of at least one uninterrupted turn, the winding including an electrical conductor including a plurality of insulated conductive elements and at least one uninsulated conductive element, a magnetically permeable electric field confining insulating covering the conductor including an inner semiconducting layer surrounding and being in electrical contact with the at least one uninsulated conductive element; a solid insulation surrounding the inner layer and an outermost semiconducting layer surrounding the insulating layer, each semiconducting layer forming an equipotential surface around the conductor.

31. An electric plant for high voltage including at least one motor comprising at least one flexible winding, including an electrical conductor including a plurality of uninsulated conductive elements and at least one uninsulated conductive element, said conductor forming at least one complete turn of the winding, an electric field confining insulating covering surrounding the conductor including an inner semiconducting layer in electrical contact with the at least one uninsulated conductive element; a solid insulation surrounding the inner layer, and an outermost semiconducting layer surrounding the insulation layer, each semiconducting layer forming an equipotential surface around the conductor.

* * * * *